US010440602B2

(12) United States Patent
Tenny et al.

(10) Patent No.: US 10,440,602 B2
(45) Date of Patent: Oct. 8, 2019

(54) SYSTEM AND METHOD FOR DATA FORWARDING IN A COMMUNICATIONS SYSTEM

(71) Applicant: Futurewei Technologies, Inc., Plano, TX (US)

(72) Inventors: Nathan Edward Tenny, Poway, CA (US); Da Wang, Beijing (CN); Guowei Ouyang, Beijing (CN); Hui Jin, Beijing (CN); Guorong Li, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/955,047

(22) Filed: Apr. 17, 2018

(65) Prior Publication Data
US 2018/0234873 A1 Aug. 16, 2018

Related U.S. Application Data

(63) Continuation of application No. 15/172,618, filed on Jun. 3, 2016, now Pat. No. 9,986,456.

(51) Int. Cl.
*H04W 28/02* (2009.01)
*H04W 52/02* (2009.01)
(Continued)

(52) U.S. Cl.
CPC ... *H04W 28/0221* (2013.01); *H04W 28/0252* (2013.01); *H04W 52/0212* (2013.01);
(Continued)

(58) Field of Classification Search
CPC ......... H04W 28/0221; H04W 28/0252; H04W 52/0212
See application file for complete search history.

(56) References Cited

U.S. PATENT DOCUMENTS 8,532,056 B2    9/2013   Ulupinar et al.
2009/0046659 A1 2/2009   Sebire et al.
(Continued)

FOREIGN PATENT DOCUMENTS

CN    102026398 A    4/2011
GB    2522937 A      8/2015
(Continued)

OTHER PUBLICATIONS

"IEEE Std 802.11ah-2016—IEEE Standard for Information technology—Local and metropolitan area networks—Specific requirements—Part 11: Wireless LAN MAC and PHY Specifications—Amendment 2: Sub 1 GHz License Exempt Operation," Apr. 30, 2017, pp. 340-349.
(Continued)

*Primary Examiner* — Ronald B Abelson
(74) *Attorney, Agent, or Firm* — Slater Matsil, LLP

(57) ABSTRACT

A method for operating a transmitting device includes receiving a first packet data convergence protocol (PDCP) protocol data unit (PDU) associated with a first remote device (RD), the first PDCP PDU including at least a first PDCP header, generating a first nested PDCP PDU in accordance with the first PDCP PDU, the first nested PDCP PDU including a second PDCP header and the first PDCP PDU, the second PDCP header comprising a first PDU type indicator indicating that the first nested PDCP PDU includes a first relayed PDCP PDU and a first identifier associated with the first RD, and sending the first nested PDCP PDU on a radio bearer.

20 Claims, 13 Drawing Sheets

(51) Int. Cl.
H04W 40/24 (2009.01)
H04W 88/04 (2009.01)

(52) U.S. Cl.
CPC .......... H04W 40/248 (2013.01); H04W 88/04 (2013.01); Y02D 70/00 (2018.01); Y02D 70/1224 (2018.01); Y02D 70/1242 (2018.01); Y02D 70/1262 (2018.01); Y02D 70/142 (2018.01); Y02D 70/144 (2018.01); Y02D 70/166 (2018.01); Y02D 70/21 (2018.01); Y02D 70/26 (2018.01)

(56) References Cited

U.S. PATENT DOCUMENTS

| | | |
|---|---|---|
| 2010/0272007 A1 | 10/2010 | Shen et al. |
| 2011/0013640 A1* | 1/2011 | Farkas .................. H04L 12/28 |
| 2011/0306309 A1 | 12/2011 | Yabe |
| 2012/0020278 A1 | 1/2012 | Moberg et al. |
| 2012/0155375 A1 | 6/2012 | Zhu |
| 2013/0142095 A1 | 6/2013 | Calcev et al. |
| 2013/0182640 A1 | 7/2013 | Liu et al. |
| 2016/0080531 A1 | 3/2016 | Agiwal |
| 2016/0150433 A1* | 5/2016 | Bergquist .............. H04W 24/10 |
| 2016/0205555 A1* | 7/2016 | Agiwal .................. H04W 4/02 |

FOREIGN PATENT DOCUMENTS

| | | |
|---|---|---|
| RU | 2492593 C2 | 9/2013 |
| RU | 2508611 C2 | 2/2014 |
| WO | 2014054883 A1 | 4/2014 |
| WO | 2015128537 A1 | 9/2015 |
| WO | 2015139324 A1 | 9/2015 |
| WO | 2016076510 A1 | 5/2016 |

OTHER PUBLICATIONS

"3GPP TR 23.703 V12.0.0 Technical Report, 3rd Generation Partnership Project; Technical Specification Group Servicesand System Aspects; Study on architecture and enhancements to support Proximity-based Services (ProSe) (Release 12)", Feb. 2014; 324 pages.

"3GPP TS 36.323 V13.1.0,, Technical Specification, 3rd Generations Partnership Project; Technical Specification Group Radio Access Network; Evolved Universal Terrestrial Radio Access (E-UTRA); Packet Data Convergence Protocol (PDCP) specification (Release 13)", Mar. 2016, 39 pages.

* cited by examiner

SYSTEM AND METHOD FOR DATA FORWARDING IN A COMMUNICATIONS SYSTEM

CROSS-REFERENCE TO RELATED APPLICATIONS

This application is a continuation of U.S. patent application Ser. No. 15/172,618, filed on Jun. 3, 2016, which is hereby incorporated herein by reference.

TECHNICAL FIELD

The present disclosure relates generally to digital communications, and more particularly to a system and method for data forwarding in a communications system.

BACKGROUND

Remote devices are typically objects with embedded electronics, software, sensors, as well as connectivity that enable the objects to exchange information with an operator, a manufacturer, a user, and/or other connected objects. The remote devices are typically small and are battery powered. As an example, remote devices used in sensing operations (e.g., weather, fire, security, health, automotive, and so on) are expected to operate for years without battery replacement or user intervention. Therefore, battery life is an important consideration.

Although the remote devices are connected, their connectivity is normally restricted to short range technologies, such as PC5, BlueTooth (BT), device-to-device (D2D), Proximity Services (ProSe), and so on, in order to help minimize power consumption. Therefore, in order to communicate with remotely located devices and/or services, an intermediary device is needed to relay communications to and from the remote devices.

SUMMARY

Example embodiments provide a system and method for data forwarding in a communications system.

In accordance with an example embodiment, a method for operating a transmitting device is provided. The method includes receiving, by the transmitting device, a first packet data convergence protocol (PDCP) protocol data unit (PDU) associated with a first remote device (RD), the first PDCP PDU including at least a first PDCP header, generating, by the transmitting device, a first nested PDCP PDU in accordance with the first PDCP PDU, the first nested PDCP PDU including a second PDCP header and the first PDCP PDU, the second PDCP header comprising a first PDU type indicator indicating that the first nested PDCP PDU includes a first relayed PDCP PDU and a first identifier associated with the first RD, and sending, by the transmitting device, the first nested PDCP PDU on a radio bearer.

In accordance with another example embodiment, a method for operating a receiving device is provided. The method includes receiving, by the receiving device, a first nested PDCP PDU associated with a first RD on a radio bearer, the first nested PDCP PDU including a first PDCP header and a first PDCP PDU, the first PDCP header includes a first PDU type indicator indicating that the first nested PDCP PDU includes a first relayed PDCP PDU and a first identifier associated with the first RD, and sending, by the receiving device, the first PDCP PDU to an intended recipient of the first PDCP PDU.

In accordance with another example embodiment, a transmitting device is provided. The transmitting device includes a processor, and a computer readable storage medium storing programming for execution by the processor. The programming including instructions to configure the transmitting device to receive a first PDCP PDU associated with a first RD, the first PDCP PDU including at least a first PDCP header, generate a first nested PDCP PDU in accordance with the first PDCP PDU, the first nested PDCP PDU including a second PDCP header and the first PDCP PDU, the second PDCP header comprising a first PDU type indicator indicating that the first nested PDCP PDU includes a first relayed PDCP PDU and a first identifier associated with the first RD, and send the first nested PDCP PDU on a radio bearer.

In accordance with another example embodiment, a receiving device is provided. The receiving device includes a processor, and a computer readable storage medium storing programming for execution by the processor. The programming including instructions to configure the receiving device to receive a first nested PDCP PDU associated with a first RD on a radio bearer, the first nested PDCP PDU including a first PDCP header and a first PDCP PDU, the first PDCP header includes a first PDU type indicator indicating that the first nested PDCP PDU includes a first relayed PDCP PDU and a first identifier associated with the first RD, and send the first PDCP PDU to an intended recipient of the first PDCP PDU.

Practice of the foregoing embodiments enables the aggregation of data to or from multiple remote devices to increase the number of remote devices supported and overall resource utilization.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to systems and methods for data forwarding in a communications system. For example, a transmitting device receives a first packet data convergence protocol (PDCP) protocol data unit (PDU) associated with a first remote device (RD), the first PDCP PDU including at least a first PDCP header, generates a first nested PDCP PDU in accordance with the first PDCP PDU, the first nested PDCP PDU including a second PDCP header and the first PDCP PDU, the second PDCP header comprising a first PDU type indicator indicating that the first nested PDCP PDU includes a first relayed PDCP PDU and a first identifier associated with the first RD, and sends the first nested PDCP PDU on a radio bearer.

The embodiments will be described with respect to example embodiments in a specific context, namely communications systems that support relaying communications for remote devices. The embodiments may be applied to standards compliant communications systems, such as those that are compliant with Third Generation Partnership Project (3GPP), IEEE 802.11, and the like, technical standards, and non-standards compliant communications systems, that support relaying communications for remote devices.

Figure 1:
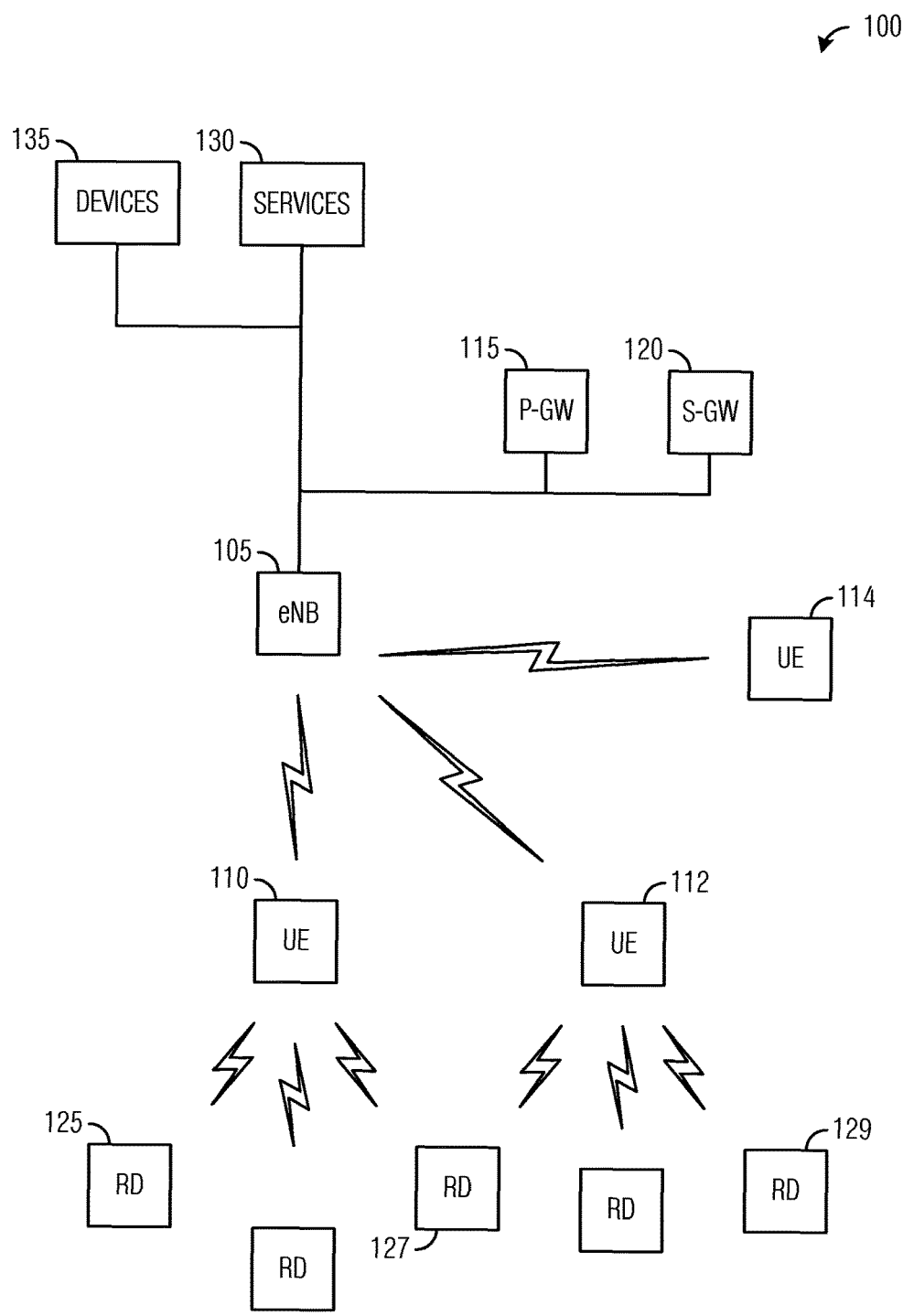
FIG. 1 illustrates an example wireless communications system according to example embodiments described herein.

FIG. 1 illustrates an example wireless communications system 100. Wireless communications system 100 includes an evolved NodeB (eNB) 105 serving a plurality of user equipments (UEs), such as UE 110, UE 112, and UE 114. In a cellular operating mode, communications to and from the plurality of UEs go through eNB 105, while in machine to machine communications mode, such as proximity services (ProSe) operating mode, for example, direct communication between UEs is possible. eNBs may also be commonly referred to as NodeBs, controllers, base stations, access points, and so on, while UEs may also be commonly referred to as mobile stations, mobiles, terminals, users, subscribers, stations, and the like. Communications from an eNB to a UE are commonly referred to as downlink communications, while communications from a UE to an eNB are commonly referred to as uplink communications.

Wireless communications system 100 also includes network entities such as a packet gateway (P-GW) 115 that provides interconnectivity between networks and a serving gateway (S-GW) 120 that provides entry and egress points for packets intended for users. Wireless communications system 100 also includes a plurality of remote devices (RDs), such as RD 125, RD 127, and RD 129. The plurality of RDs may include sensor devices, wearable devices, smart appliances, and so on. While it is understood that communications systems may employ multiple eNBs capable of communicating with a number of UEs and RDs, only one eNB, a number of UEs, and a number of RDs are illustrated for simplicity.

As discussed previously, the RDs typically have limited connectivity options in terms of range. As an example, due to power consumption considerations, it is unlikely that RDs will have medium to long range wireless connectivity, such as 3GPP LTE, longer-range IEEE 802.11 WiFi technologies, code division multiple access (CDMA), and the like, connectivity. Further, even RDs that do support a longer range communications technology may experience degraded link budgets compared to typical longer-range devices such as smartphones, due to restrictions on power consumption and/or radio performance. Therefore, UEs in a wireless communications system may serve as relays to relay communications to and from the RDs. UEs may connect to RDs over short range connectivity, such as PC5, BlueTooth, ProSe, shorter-range IEEE 802.11 WiFi technologies, D2D, and so on connections, and forward packets between the RDs and remotely located services and/or devices. The UEs providing relay services may be referred to as relay UEs. Relay UEs may also operate as normal UEs. As an illustrative example, UE 110 serves as a relay for RD 125 and RD 127, while UE 112 serves as a relay for RD 127 and RD 129, providing connectivity between the RDs and remotely located services 130 and/or devices 135 by way of eNB 105.

While UE 112 is serving as a relay for RD 127 and RD 129, a user of UE 112 may also using UE 112 for other activities, such as a voice call, as well as using a computer connected to the Internet utilizing hotspot services provided by UE 112, for example.

A relay UE may provide relay services for one or more RDs, receiving protocol data units (PDUs) from the RDs and forwarding the received PDUs to the eNB serving the relay UE or receiving PDUs from the eNB serving the UE and forwarding the received PDUs to respective RDs. In general, a PDU comprises a packet header and one or more packets, where the packet header includes information in a specified format that ensures the one or more packets reach the intended destination. The number of RDs supported by a single relay UE may grow quickly. As an example, a relay UE is expected to relay PDUs for RDs owned by the owner of the UE, including a smart watch, smart glasses, a fitness or activity tracker, and so on. The relay UE may also relay PDUs for other RDs that it may encounter throughout the day. The relay UE may use a separate data radio bearer (DRB) for each RD. However, there may be a limit on the number of DRBs, thereby placing a limit on the number of RDs supported by the relay UE. As an illustrative example, in 3GPP LTE, the maximum number of DRBs is 8, which is a relatively small number since a relay UE may already be relaying PDUs for 3 or more RDs owned by its owner.

Figure 2:
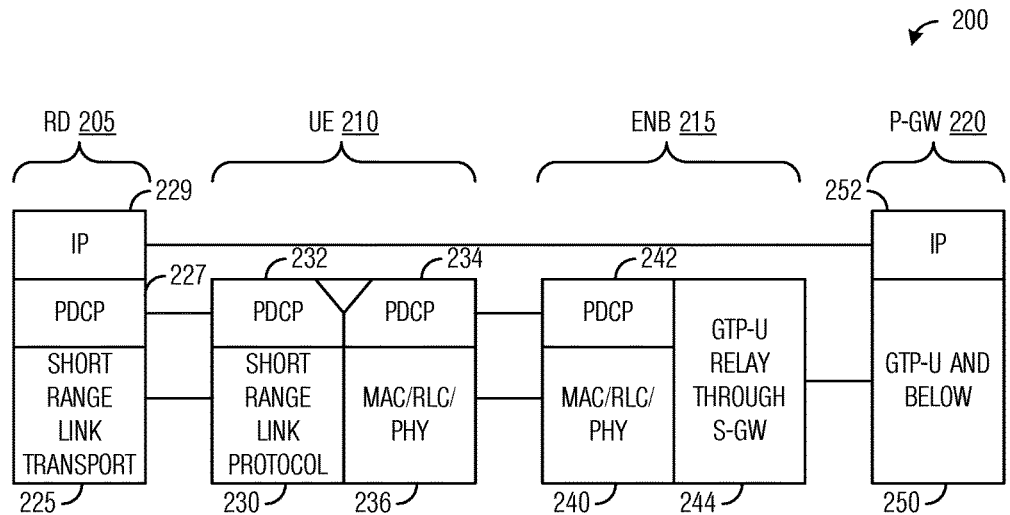
FIG. 2 illustrates a diagram of example protocol stacks for a wireless communications system supporting relay UEs according to example embodiments described herein.

FIG. 2 illustrates a diagram 200 of example protocol stacks for a wireless communications system supporting relay UEs. Diagram 200 includes protocol stacks for a RD 205, a relay UE 210, an eNB 215, and a P-GW 220. A protocol stack for RD 205 includes a short range link transport entity 225 that controls processing for transmitting and receiving PDUs on a direct link between RD 205 and relay UE 210, a packet data convergence protocol (PDCP) entity 227 that controls processing of PDCP PDUs received or transmitted by RD 205, and an Internet protocol (IP) entity 220 that processes IP protocol PDUs received or transmitted by RD 205. A protocol stack for relay UE 210 includes a short range link protocol entity 230 that controls processing for transmitting and receiving PDUs on a direct link between relay UE 210 and RD 205, a first PDCP entity 232 that processes PDCP PDUs received from or transmitted to RD 205, a second PDCP entity 234 that processes PDCP PDUs received from or transmitted to eNB 215, and media access control (MAC)/radio link control (RLC)/physical (PHY) layer entities 236 that provides MAC, RLC, and PHY layers processing for PDUs received from or transmitted to eNB 215.

A protocol stack for eNB 215 includes MAC/RLC/PHY layer entities 240 that provide MAC, RLC, and PHY layers processing for PDUs received from or transmitted to relay UE 210, a PDCP layer entity 242 that processes PDCP PDUs received from or transmitted to relay UE 210, and a general packet radio service (GPRS) tunneling protocol (GTP) for user data (GTP-U) relay entity 244 that provides relay services for PDUs through a S-GW. A protocol stack for P-GW 220 includes a GTP-U relay entity 250 that processes PDUs received from or transmitted to eNB 215, and an IP entity 252 that processes IP protocol PDUs received or transmitted by P-GW 220.

Although FIG. 2 illustrates direct connections between entities of the same level in the protocol stacks, PDUs are not directly transferred between entities of the same level in the protocol stacks. Instead PDUs traverse the respective protocol stacks of the source device and the destination device, as well as any intermediary device. As an illustrative example, an IP PDU from P-GW 220 received by RD 205 starts at IP entity 252 and then goes through GTP-U relay entity 250, GTP-U entity 244, PDCP entity 242, MAC/RLC/PHY layers entity 240, MAC/RLC/PHY layers entity 236, second PDCP entity 234, first PDCP entity 232, short range link protocol entity 230, short range link transport entity 225, and PDCP entity 227 before arriving at IP entity 229.

According to an example embodiment, the PDUs associated with RDs are aggregated on a single DRB. The PDUs associated with the RDs relayed by a single relay UE on the uplink are aggregated and transmitted on a single DRB between the relay UE and its serving eNB. Aggregating the PDUs on a single DRB allows the relay UE to support more RDs than if the PDUs associated with each RD are sent using individual DRBs. Therefore, the number of RDs supported is increased and communications system efficiency is increased. The PDUs associated with the RDs relayed by a single relay UE on the downlink are received on a single DRB at the relay UE and split into individual PDUs and forwarded to the corresponding RDs.

According to an example embodiment, the PDCP PDUs associated with RDs are aggregated on a single DRB. The PDCP PDUs associated with the RDs relayed by a single relay UE on the uplink are aggregated and transmitted on a single DRB between the relay UE and its serving eNB. The PDCP PDUs associated with the RDs relayed by a single relay UE on the downlink are received on a single DRB at the relay UE and split into individual PDCP PDUs and forwarded to the corresponding RDs.

Figure 3:
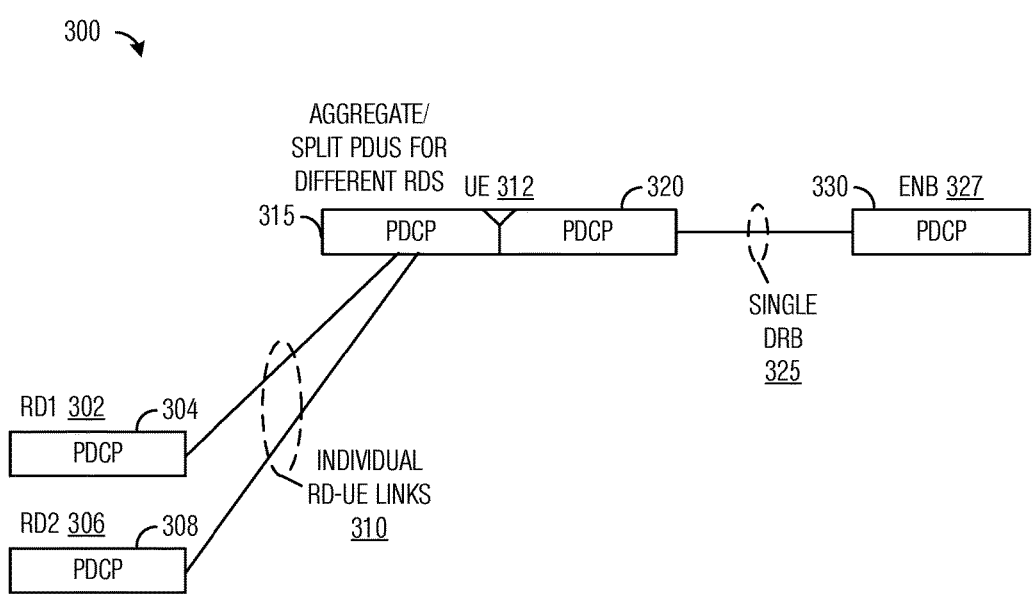
FIG. 3 illustrates example connections between PDCP entities of devices of a wireless communications system support relay UEs according to example embodiments described herein.

FIG. 3 illustrates example connections between PDCP entities of devices of a wireless communications system support relay UEs. In the uplink, as shown in FIG. 3, a first RD (RD1) 302 with a PDCP entity 304 and a second RD (RD2) 306 with a PDCP entity 308 are logically connected at the PDCP level to relay UE 312 by individual RD-UE links 310. Relay UE 312 is logically connected to eNB 327 by a single DRB 325. PDCP PDUs from the separate RDs are sent over individual RD-UE links 310 to relay UE 312, where a first PDCP entity 315 receives the PDCP PDUs and forwards them to a second PDCP entity 320 that generates multiple nested PDCP PDUs and aggregates them together. Second PDCP entity 320 sends the aggregated PDCP PDU to eNB 327 over single DRB 325. A PDCP entity 330 processes the aggregated PDCP PDU.

In the downlink, PDCP entity 330 sends an aggregated PDCP PDU containing a plurality of nested PDCP PDUs over single DRB 325 to second PDCP entity 320 of relay UE 312. Second PDCP entity 320 splits the aggregated PDCP PDU into multiple nested PDCP PDUs and forwards the multiple nested PDCP PDUs to first PDCP entity 315. First PDCP entity 315 sends the multiple nested PDCP PDUs over individual RD-UE links 310 to their respective RDs.

Figure 4:
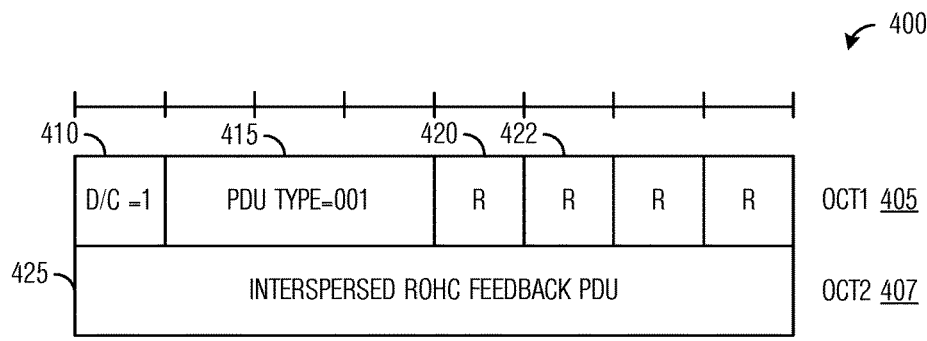
FIG. 4 illustrates an example PDCP PDU according to example embodiments described herein.

FIG. 4 illustrates an example PDCP PDU 400. PDCP PDU 400 illustrates a robust header compression (RoHC) feedback PDU as an example of a PDCP control PDU. PDCP PDU 40o includes at least a first octet (OCTET1) 405 and a second octet (OCTET2) 407. First octet 405 includes control information, such as a PDU type indicator in data/control (D/C) bit 410, a PDU type indicator in PDU type field 415, and a plurality of reserved bits, such as bit 420 and bit 422. As a RoHC feedback PDU, D/C bit 410 is set to "1" indicating that PDCP PDU 400 comprises a control PDU and PDU type field 415 is set to "001" indicating that PDCP PDU 400 is a RoHC feedback PDU. Second octet 407 comprises the feedback information of RoHC feedback PDU (i.e., PDCP PDU 400). If PDU type field 415 is set to "000", then PDCP PDU 400 is a status report PDU. Other values of PDU type field 415 are reserved for future use.

First octet (OCTET1) 405 may be used in a manner that is similar to how a packet header of a PDU would be used. The information included in first octet 405 follows a specified format and content may be used to describe the format and content of PDCP PDU 400 to help ensure that PDCP PDU 400 is properly processed, while a packet header of a PDU contains information with a specific format and content that helps to ensure that the PDU reaches its intended destination. Therefore, the information included at the beginning of the PDCP PDU, e.g., first octet 405, may be referred to as being a header, although it is technically not a packet header. As used herein, the term header identifies information having a specific format and content that is used to ensure that a PDCP PDU is properly processed, while the term packet header identifies information having specific format and content that is used to ensure that a PDU reaches its intended destination. Although the discussion focuses on the first octet of a PDCP PDU being referred to as a header, the example embodiments presented herein are operable with other amounts of information, such as subsets of the first octet, multiple octets, a subset of multiple octets, and so on, including information that follows a specified format and content and being used to help ensure that the PDCP PDU is properly processed. Therefore, these other amounts of information may also be referred to as headers.

According to an example embodiment, a new PDCP PDU type is specified to enable a distinguishing of RDs associated with PDCP PDUs that are aggregated together, for example, on a single DRB. The use of separate DRBs for different RDs makes it possible to distinguish which RD is the sender or the recipient of a PDCP PDU. However, if multiple PDCP PDUs are aggregated together and sent over a single DRB, it is not possible to easily identify the sender or recipient of a PDCP PDU.

According to an example embodiment, a nested PDCP PDU utilizes the existing PDCP PDU format with the PDU type field set to a specified value. The utilization of an existing PDU format eliminates the need to design a new PDU format. Furthermore, legacy devices are still able to detect the nested PDCP PDU, although they do not know how to process the nested PDCP PDU since it has the appearance of a PDCP PDU but with a PDU type field set to a value that is undefined.

According to an example embodiment, one or more of the reserved values of a PDU type field of a PDCP PDU is used to indicate a nested PDCP PDU. A first value of the PDU type field may be used to indicate that the nested PDCP PDU contains a data PDU for forwarding. A second value of the PDU type field may be used to indicate that the nested PDCP PDU contains a data PDU for forwarding, with contents that comprises signaling rather than user data. For short, the data PDU with contents comprising signaling may be referred to as signaling PDU for forwarding. The first and second values of the PDU type field may be selected from possible PDU type field values that are not already reserved. As an illustrative example, values "000" and "001" are already reserved, so the first and second values may be selected from values "010", "011", "100", "101", "no", and "111" (i.e., the remaining 6 possible values of the PDU type field). The first value may be "010" and the second value may be "011", for example. Alternatively, a single value of the PDU type field may be used to indicate that the nested PDCP PDU contains data for forwarding, irrespective of whether the data comprise user data (a data PDU) or signaling (a signaling message).

According to an example embodiment, the first nested PDCP PDU type indicates that the nested PDCP PDU includes a data PDU for forwarding and the second nested PDCP PDU type indicates that the nested PDCP PDU includes a signaling PDU for forwarding. In a situation where a nested PDCP PDU is of the second nested PDCP PDU type (e.g., the PDU type field is equal to the second value or "011"), a relay UE may be able to send the nested PDCP PDU as data on a DRB or as signaling on a signaling radio bearer (SRB), even if the RD signaling is carried on the DRB of the relay UE. The exact behavior may depend upon the access technology of the RD-UE link. As an illustrative example, if the RD-UE link uses LTE sidelink transport via a PC5 interface, the PDU type of the nested PDCP PDU determines if the PDCP PDU contained within the nested PDCP PDU is sent on a sidelink data radio bearer (S-DRB) or a sidelink signaling radio bearer (S-SRB). It is noted that other access technologies may have different rules that apply.

Figure 5:
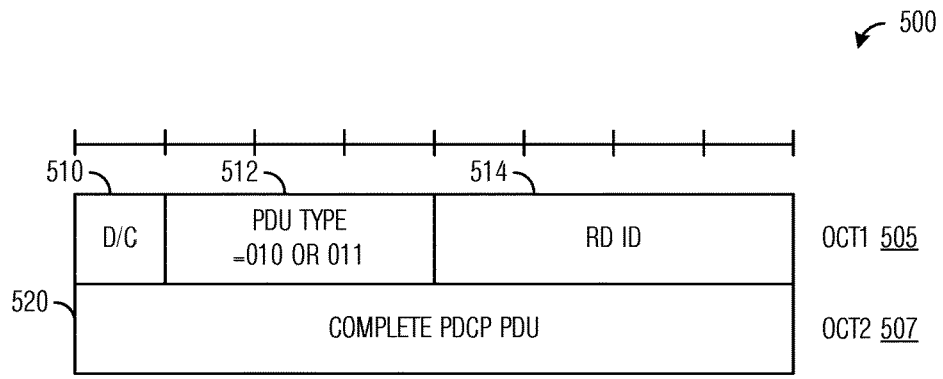
FIG. 5 illustrates an example nested PDCP PDU according to example embodiments described herein.

FIG. 5 illustrates an example nested PDCP PDU 500. A first octet (OCT1) 505 may include control information for nested PDCP PDU 500. First octet 505, serving as a header, includes a D/C bit 510 that indicates if nested PDCP PDU 500 is a data PDU or a control PDU, a PDU type field 512 that indicates PDU type, and an RD identifier field 514 that indicates an identifier (i.e., RD ID) of an RD associated with a PDCP PDU contained in nested PDCP PDU 500. D/C bit 510 may be a 1 bit field, PDU type field 512 may be a 3 bit field, and RD identifier field 514 may be a 4 bit field. Being 4 bits in size, RD identifier field 514 enables nested PDCP PDU 500 to support up to 16 RDs. However, RD identifier field 514 may be made larger to enable support for a larger number of RDs, for example, RD identifier field 514 may extend into a second octet or more as needed. A second octet (OCT2) 507 and subsequent octets of nested PDCP PDU 500 as needed comprise a complete PDCP PDU 520. In other words, second octet 507 and subsequent octets of nested PDCP PDU 500 are used to hold the PDCP PDU being aggregated.

Figure 6:
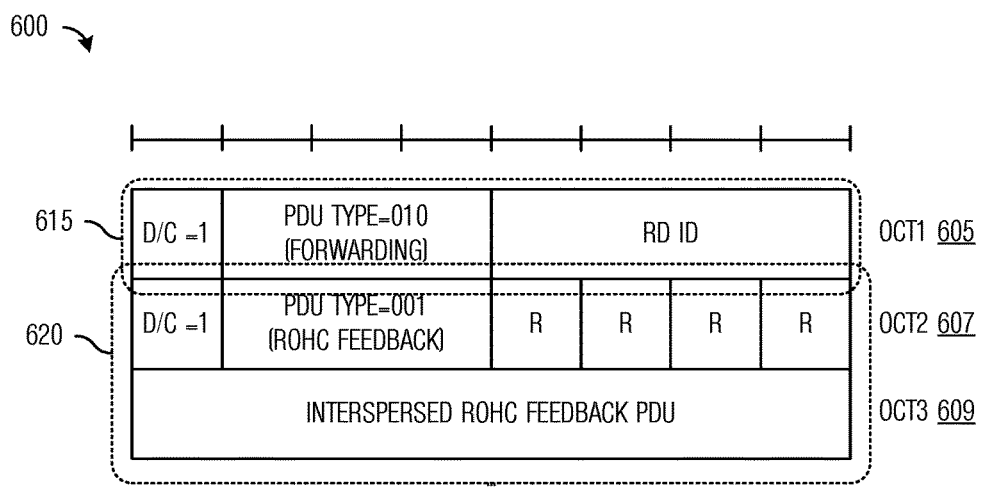
FIG. 6 illustrates an example nested PDCP PDU including a RoHC feedback PDU according to example embodiments described herein.

FIG. 6 illustrates an example nested PDCP PDU 600 including a RoHC feedback PDU. Nested PDCP PDU 600 includes a first octet (OCT1) 605 that serves as a header 615 for nested PDCP PDU 600. Nested PDCP PDU 600 also includes a second octet (OCT2) 607 and a third octet (OCT3) 609 (as well as subsequent octets as needed) that contains a RoHC feedback PDU 620. RoHC feedback PDU 620 is a complete PDCP PDU, such as PDCP PDU 400 shown in FIG. 4.

The nested PDCP PDU, such as nested PDCP PDU 500 and nested PDCP PDU 600, enables PDCP-in-PDCP processing, where a sending PDCP entity in a first device generates a double header PDU (a PDU with two headers). A first header may be used to identify an RD associated with a PDCP PDU contained within the nested PDCP PDU as the nested PDCP PDU is aggregated and sent over a single DRB and that nested PDCP PDU 500 is indeed a nested PDCP PDU. A second header is used to identify the PDCP PDU itself.

Figure 7:
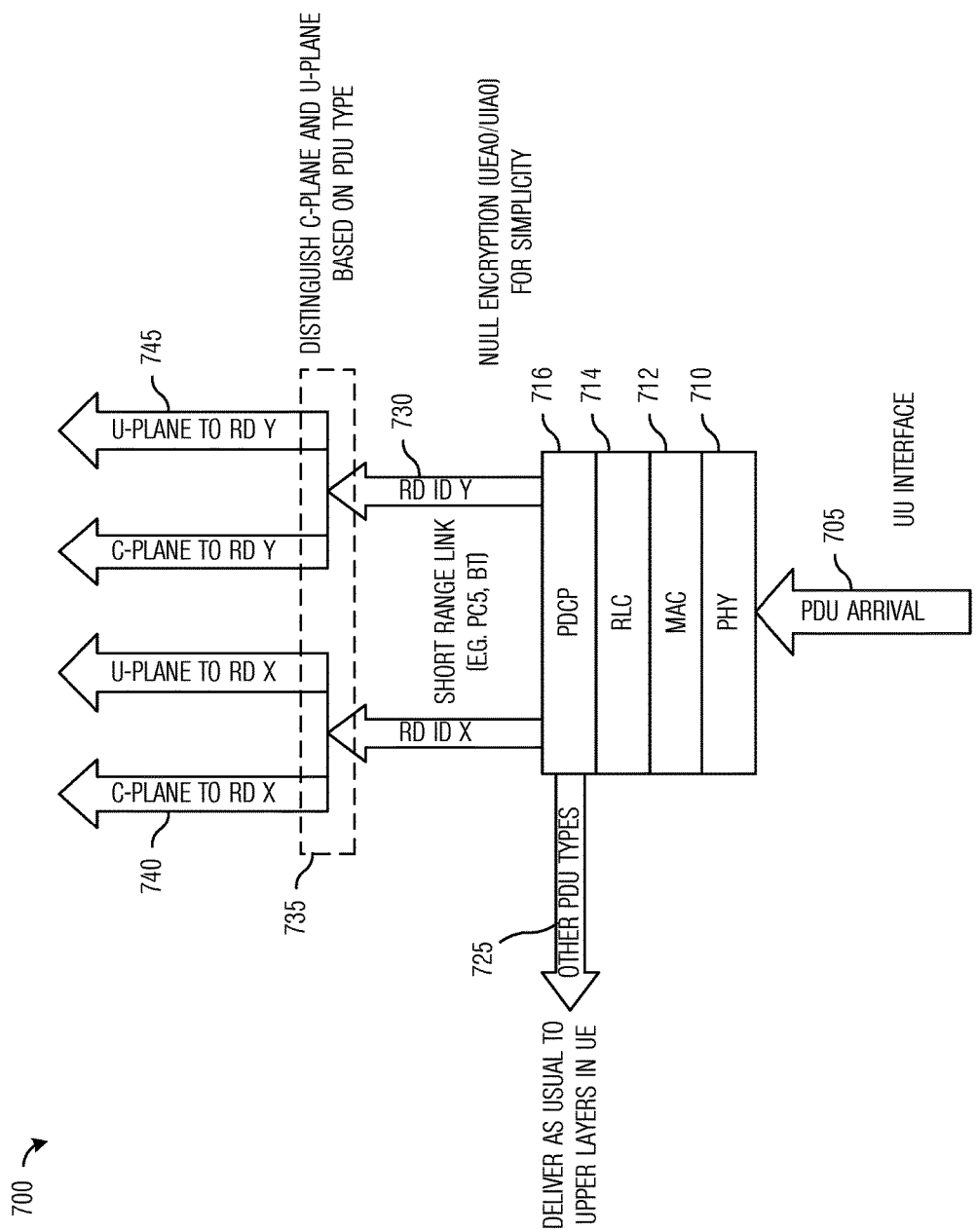
FIG. 7 illustrates a flow diagram of example processing occurring in a downlink according to example embodiments described herein.

FIG. 7 illustrates a flow diagram of example processing 700 occurring in a downlink. A PDCP PDU arrives at a relay UE (event 705). The PDCP PDU arrives over a DRB over a Universal Mobile Telecommunications System (UMTS) air interface between the UMTS Terrestrial Radio Access Network (UTRAN) and the relay UE (or simply, Uu interface), for example. The PDCP PDU is processed by entities in a PHY layer 710, a MAC layer 712, a RLC layer 714, and a PDCP layer 716.

Processing in PDCP layer 716 may include determining if the PDCP PDU is a nested PDCP PDU. The determining if the PDCP PDU is or is not a nested PDCP packet may be performed by examining the PDU type field in the header of the PDCP PDU. If the PDCP PDU is not a nested PDCP PDU, the PDCP PDU is delivered as usual to upper layers of the relay UE (event 725). If the PDCP PDU is a nested PDCP PDU (if the PDU type field is set to either first value, "010", or the second value, "011", for example), the entity of PDCP layer 716 may strip the first header off the PDCP PDU and send the PDCP PDU, as modified, over a short range link to a recipient RD as indicated in the RD identifier field, such as short range link associated with RD ID Y 730. Alternatively, the entity of PDCP layer 716 may send the PDCP PDU without stripping the first header, and rely on the recipient to process the second header correctly.

Processing in RDs may distinguish control plane (C-plane) or user plane (U-plane) communications based on the value in the PDU type field (event 735) and forward the PDCP PDU, as modified, in the respective plane (either U-plane if the value in the PDU type field is set to first value or C-plane if the value in the PDU type field is set to the second value) of the RD-UE link, such as U-plane to RD Y 745 or C-plane to RD X 740, for example.

The downlink communications shown in FIG. 7 is for a single DRB between eNB and relay UE for carrying RD data. Situations exist where there are multiple DRBs between eNB and relay UE. For example, multiple DRBs may be present to implement Quality of Service (QoS) differentiation. In situations where there are multiple DRBs, the same processing occurs individually for each DRB.

Figure 8:
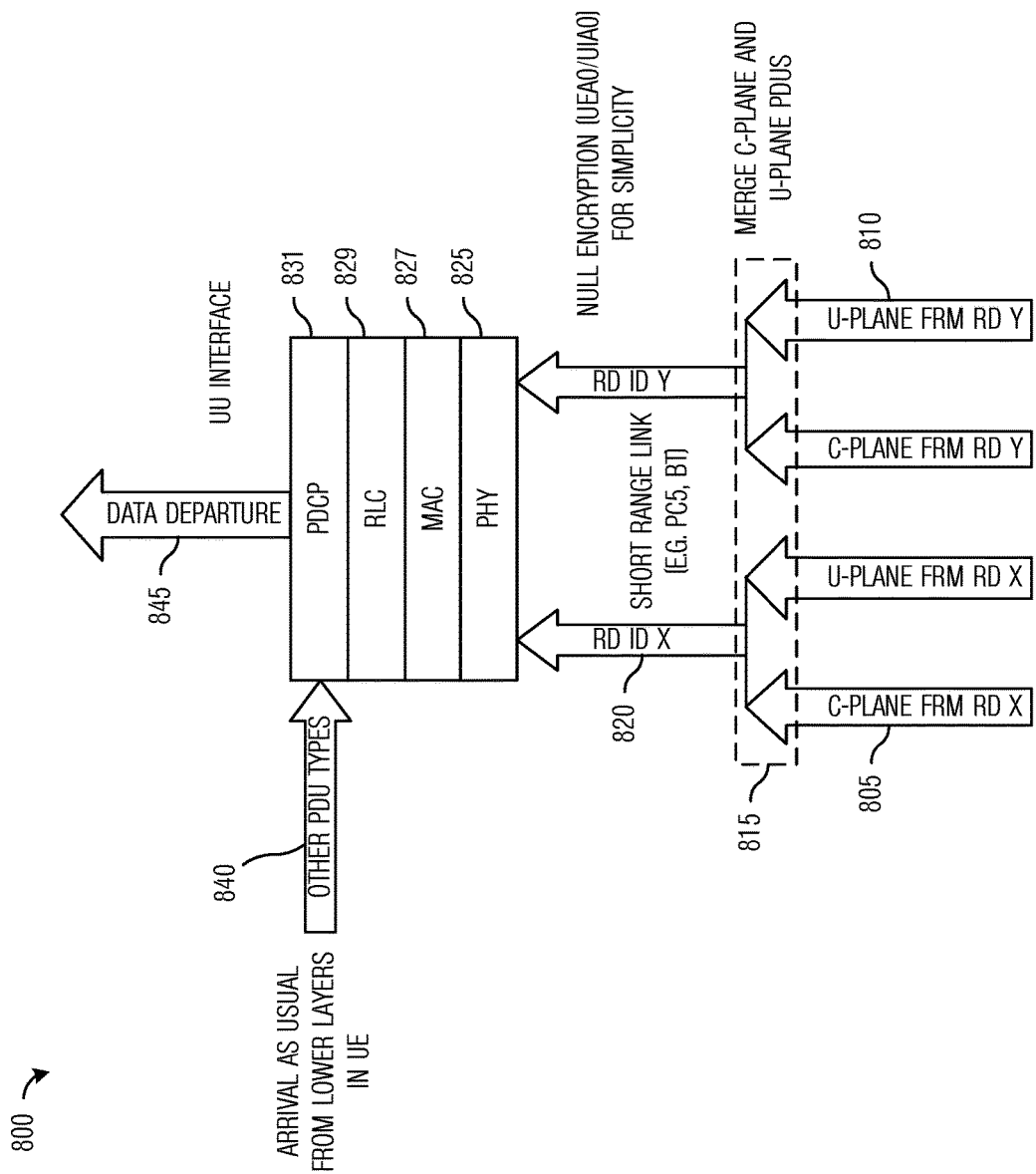
FIG. 8 illustrates a flow diagram of example processing occurring in an uplink according to example embodiments described herein.

FIG. 8 illustrates a flow diagram of example processing 800 occurring in an uplink. One or more PDCP PDUs arrive over C-plane or U-plane of various RD-UE links, such as C-plane of RD X 805 or U-plane of RD Y 810, for example. Processing in the RDs may merge C-plane and U-plane PDCP PDUs on a per RD basis (event 815). The PDCP PDUs (both C-plane and U-plane PDCP PDUs) are received at a relay UE over short range links associated with respective RDs, such as short range link for RD X 820.

The PDCP PDUs are processed by entities in a PHY layer 825, a MAC layer 827, a RLC layer 829, and a PDCP layer 831. The entity in PDCP layer 831 may also receive and process PDCP PDUs of other types (PDCP packets with PDU type field is set to values other than the first value, "010", or the second value, "011", for example) from lower layers of the relay UE (event 840). The entity in PDCP layer 831 places the PDCP PDUs from the RDs into nested PDCP PDUs with the headers of the nested PDCP PDUs adjusted to corresponding to the source RD of each PDCP PDU included in the corresponding nested PDCP PDU. The nested PDCP PDUs are aggregated and sent over a DRB to an eNB (event 845). Any PDCP PDUs associated with the protocol entities for the same DRB, but not received from RDs, are also sent to the eNB.

Figures 9, 10:
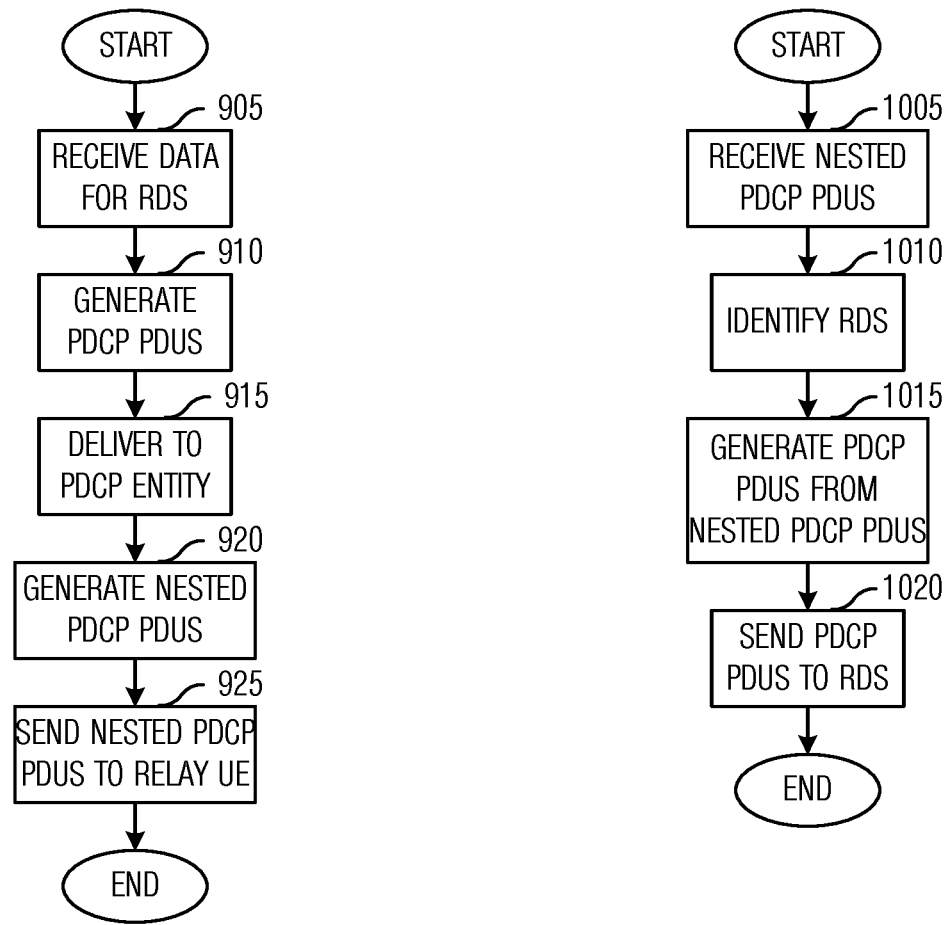
FIG. 9 illustrates a flow diagram of example operations occurring in an eNB participating in downlink communications with RDs according to example embodiments described herein.
FIG. 10 illustrates a flow diagram of example operations occurring in a relay UE participating in downlink communications with RDs according to example embodiments described herein.

FIG. 9 illustrates a flow diagram of example operations 900 occurring in an eNB participating in downlink communications with RDs. Operations 900 may be indicative of operations occurring in an eNB as the eNB participates in downlink communications with RDs. The eNB is operating as a sending device.

Operations 900 begin with the eNB receiving data for RDs (block 905). The eNB generates PDCP PDUs from the data (block 910). The PDCP PDUs are delivered to PDCP entities at the eNB that are associated with relay UEs relaying for the respective RDs (block 915). The PDCP entities generate nested PDCP PDUs from the PDCP PDUs (block 920). The headers of the nested PDCP PDUs include RD identifiers of the RD recipient of the nested PDCP PDUs. The eNB sends the nested PDCP PDUs to the respective relay UEs (block 925). The sending of the nested PDCP PDUs includes aggregating the nested PDCP PDUs so that each eNB-relay UE pair is served by a single DRB.

FIG. 10 illustrates a flow diagram of example operations 1000 occurring in a relay UE participating in downlink communications with RDs. Operations 1000 may be indicative of operations occurring in a relay UE as the relay UE participates in downlink communications with RDs. The relay UE is operating as a receiving device.

Operations 900 begin with the relay UE receiving nested PDCP PDUs (block 905). The relay UE identifies RDs associated with each nested PDCP PDU (block 1010). The relay UE generates PDCP PDUs from the nested PDCP PDUs (block 1015). As an example, the relay UE strips the nested header from the nested PDCP PDUs to generate the PDCP PDUs. The relay UE sends the PDCP PDUs to respective RDs (block 1020). The PDCP PDUs are sent to the respective RDs over short range links. Alternatively, the relay UE does not generate PDCP PDUs from the nested PDCP PDUs and send the nested PDCP PDUs to respective RDs without modification.

Figure 11:
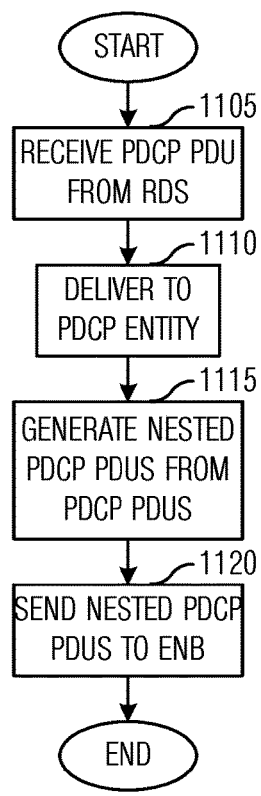
FIG. 11 illustrates a flow diagram of example operations occurring in a relay UE participating in uplink communications with RDs according to example embodiments described herein.

FIG. 11 illustrates a flow diagram of example operations 1100 occurring in a relay UE participating in uplink communications with RDs. Operations 1100 may be indicative of operations occurring in a relay UE as the relay UE participates in uplink communications with RDs. The relay UE is operating as a sending device.

Operations 1100 begin with the relay UE receiving PDCP PDUs from RDs (block 1105). The PDCP PDUs are received over short range links. The relay UE delivers the PDCP PDUs to a PDCP entity associated with an eNB serving the relay UE (block 1110). The PDCP entity of the relay UE generates nested PDCP PDUs from the PDCP PDUs (block 1115). The headers of the nested PDCP PDUs include identifiers of the RDs associated with the PDCP PDUs. The relay UE sends the nested PDCP PDUs to the eNB (block 1120). The sending of the nested PDCP PDUs includes aggregating the nested PDCP PDUs so that the relay UE-eNB pair is served by a single DRB.

Figure 12:
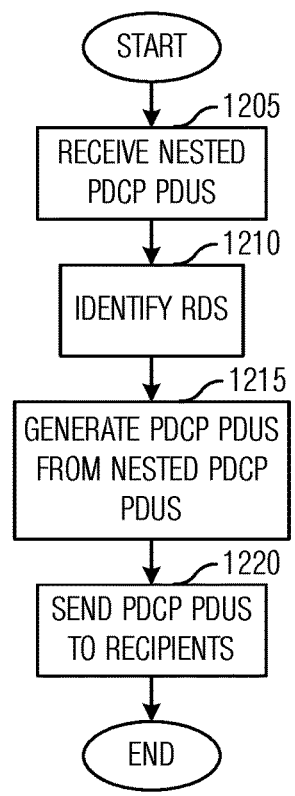
FIG. 12 illustrates a flow diagram of example operations occurring in an eNB participating in uplink communication with RDs according to example embodiments described herein.

FIG. 12 illustrates a flow diagram of example operations 1200 occurring in an eNB participating in uplink communication with RDs. Operations 1200 may be indicative of operations occurring in an eNB as the eNB participates in uplink communications with RDs. The eNB is operating as a receiving device.

Operations 1200 begin with the eNB receiving nested PDCP PDUs (block 1205). The eNB identifies RDs associated with each nested PDCP PDU (block 1210). The eNB generates PDCP PDUs from the nested PDCP PDUs (block 1215). As an example, the eNB strips the nested header from the nested PDCP PDUs to generate the PDCP PDUs. The eNB sends the PDCP PDUs to respective recipients (block 1220). Alternatively, the eNB does not generate PDCP PDUs from the nested PDCP PDUs and send the nested PDCP PDUs to respective recipients without modification.

Figure 13:
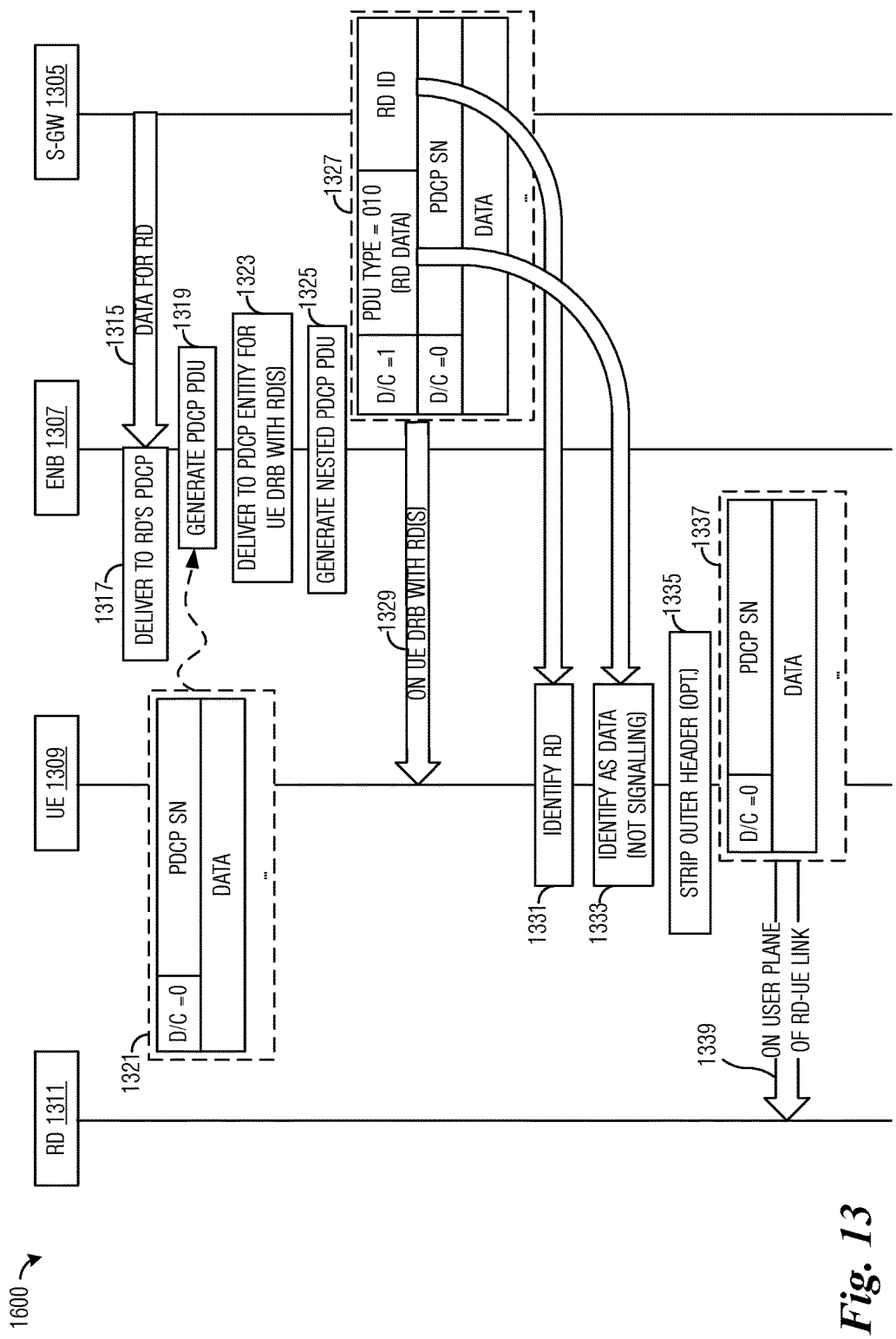
FIG. 13 illustrates a message flow diagram highlighting messages exchanged between devices and operations performed by the devices as the devices perform downlink communications with RDs according to example embodiments described herein.

FIG. 13 illustrates a message flow diagram 1300 highlighting messages exchanged between devices and operations performed by the devices as the devices perform downlink communications with RDs. Message flow diagram 1300 displays messages exchanged and operations performed by a S-GW 1305, an eNB 1307, a relay UE 1309, and a RD 1311.

eNB 1307 receives data intended for RD 1311 (event 1315). The data is delivered to a PDCP entity associated with RD 1311 (event 1317). eNB 1307 generates one or more PDCP PDUs from the data (event 1319). The PDCP PDUs follow format 1321, as discussed previously. eNB 1307 delivers the PDCP PDUs to a PDCP entity associated with relay UE 1309 (event 1323). eNB 1307 generates nested PDCP PDUs from the PDCP PDUs (event 1325). Each PDCP PDU results in a nested PDCP PDU. The nested PDCP PDUs follow format 1327. As an illustrative example, in a situation when eNB 1607 is generating a nested PDCP PDU for RD 1311 with ID X (where X is a 4 bit identifier that uniquely identifies RD 1311 within the DRB for relay UE 1309) eNB 1307 may process the PDCP PDU using a PDCP entity associated with RD 1311. eNB 1307 may prepend octet "1010"+X for user data (where "1010" comprises "1" of a D/C bit and "010" of a PDU type field) and "ion"+X for signaling (where "1011" comprises "1" of a D/C bit and "011" of a PDU type field), for example. eNB 1307 may submit the nested PDCP PDU to lower layers for transmission. In a situation when there are multiple nested PDCP PDUs, the nested PDCP PDUs are aggregated so that they can be sent on a single DRB to relay UE 1309 (event 1329).

Relay UE 1309 identifies RDs associated with each nested PDCP PDU (event 1331). Relay UE 1309 identifies the PDU types of each PDCP PDU contained in the nested PDCP PDUs (event 1333). The PDU type of a PDCP PDU is indicated in a PDU type field in the PDCP PDU. Depending upon implementation, relay UE 1309 strips the outer headers (the headers of the nested PDCP PDUs) of the nested PDCP PDUs (event 1335). In situations when relay UE 1309 strips the outer headers of the nested PDCP PDUs by removing the leading octet of the nested PDCP PDUs, the resulting PDCP PDUs follow format 1337. Relay UE 1309 sends the PDCP PDUs (or nested PDCP PDUs in the example embodiment wherein relay UE 1309 does not strip the outer header) to respective RDs (event 1339). The PDCP PDUs (or the nested PDCP PDUs) are sent on short range links between relay UE 1309 and RD 1311. As an example, the ID X may also be used to identify an appropriate lower-layer entity to send the PDCP PDUs to the respective RDs, with the details depending on the radio access technology used in the short range link.

In the uplink, processing is similar to the processing occurring at the relay UE and the eNB are similar to the downlink processing but reversed with the relay UE performing the transmission of the nested PDCP PDUs and the eNB receiving the nested PDCP PDUs. At the relay UE, when a PDCP PDU intended for a RD with ID X arrives, the relay UE delivers the PDCP PDU to a PDCP entity associated with a corresponding DRB of the relay UE. The relay UE may prepend octet "1010"+X for user data (where "1010" comprises "1" of a D/C bit and "010" of a PDU type field) or octet "1011"+X for signaling (where "1011" comprises "1" of a D/C bit and "011" of a PDU type field). The relay UE submits the nested PDCP PDU to lower layers for transmission. At the eNB, when a nested PDCP PDU for a RD with ID X is received over a DRB with the relay UE, the eNB determines the ID of the RD. Depending on implementation, the eNB removes or does not remove the header of the nested PDCP PDU (i.e., the leading octet). The PDCP PDU is delivered to a PDCP entity associated with the RD. The eNB (i.e., the PDCP entity) passes the PDCP PDU to a corresponding S1 bearer for the DRB. It is noted that an identifier may be used on Stu to disambiguate RDs.

According to an example embodiment, systems and methods for processing control plane traffic to or from the RDs are provided. The discussion presented above is mainly focused on user plane traffic to or from the RDs. However, situations exist wherein control plane traffic is sent to or received from the RDs. Examples of control plane traffic include radio resource control (RRC) traffic, non-access stratum (NAS) traffic, and the like. The control plane traffic may be generated at the eNB or received by the eNB and encapsulated at the eNB. However, the eNB sends the control plane traffic to the relay UE on a DRB and not an SRB between the eNB and the relay UE. As an illustrative example, a nested PDCP PDU with the PDU type field set to the second value (e.g., "011") is used to relay control plane traffic.

Figure 14:
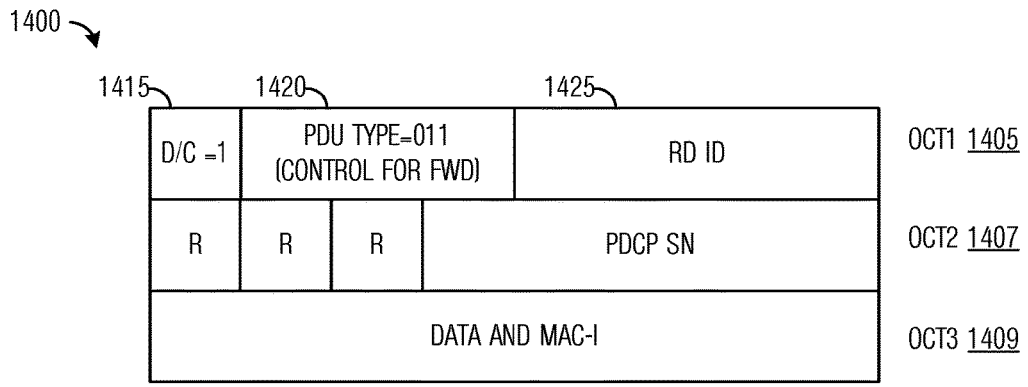
FIG. 14 illustrates an example nested PDCP PDU used to relay control plane traffic according to example embodiments described herein.

FIG. 14 illustrates an example nested PDCP PDU 1400 used to relay control plane traffic. Nested PDCP PDU 1400 includes a first octet (OCT1) 1405 serving as a header. First octet 1405 includes a D/C bit 1415 that indicates if nested PDCP PDU 1400 comprises a data PDU for forwarding or a control PDU for forwarding, a PDU type field 1420 that indicates PDU type, and an RD identifier field 1425 that indicates an identifier (i.e., RD ID) of an RD associated with a PDCP PDU contained in nested PDCP PDU 1400. D/C bit 1415 may be a 1 bit field, PDU type field 1420 may be a 3 bit field, and RD identifier field 1425 may be a 4 bit field. PDU type field 1420 is set to the second value, e.g., "011", to indicate that nested PDCP PDU 1400 is used to relay control plane traffic. In other words nested PDCP PDU 1400 contains a signaling message. Second octet (OCT2) 1407, third octet (OCT3) 1409, and subsequent octets may be compliant to the PDCP Data PDU format for SRBs as specified in 3GPP Technical Standard TS 36.323 FIG. 6.2.2.1, which is hereby incorporated herein by reference.

RRC or NAS signaling for the RD may be sent on either SRB1 or SRB2. Preserving the distinction of which SRB was used to send the RRC or NAS signaling may be important to the relay UE, which may utilize the information in accordance with technical specifics of the short range links between the relay UE and the RDs. As an example, the SRB information may be provided to the RDs, even in a situation when the short range link does not have multiple SRBs. The SRB information may also be useful in the uplink. As an example, an RD may set the SRB information to inform the relay UE to send the control plane traffic on a particular SRB, even if the short range link does not have multiple SRBs.

Figure 15:
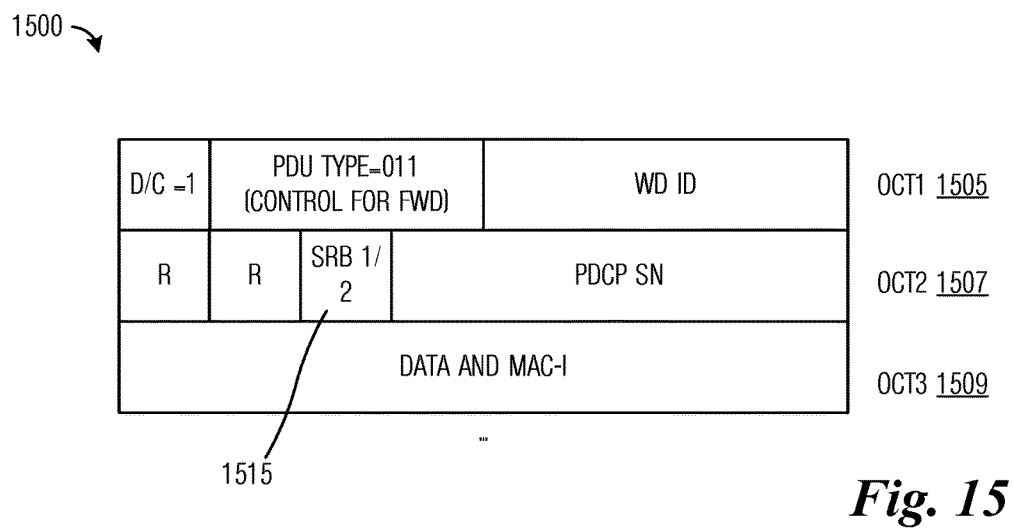
FIG. 15 illustrates an example nested PDCP PDU used to relay control plane traffic while preserving a distinction of which SRB was used to convey the control plane traffic according to example embodiments described herein.

FIG. 15 illustrates an example nested PDCP PDU 1500 used to relay control plane traffic while preserving a distinction of which SRB was used to convey the control plane traffic. Nested PDCP PDU 1500 includes a first octet (OCT1) 1505 serving as a header and is the same as first octet 1405 of nested PDCP PDU 1400. Second octet (OCT2) 1507 includes an SRB bit 1515 that indicates if SRB1 or SRB2 was used to convey the control plane traffic. SRB bit 1515 may have been a reserved bit or bits in second octet 1507. As an illustrative example if SRB bit 1515 is set to "0" then SRB1 was used or if SRB bit 1515 is set to "1" then SRB2 was used. Alternatively, a bit in third octet (OCT3) 1509 or any subsequent octet may be used as a SRB bit.

Figure 16:
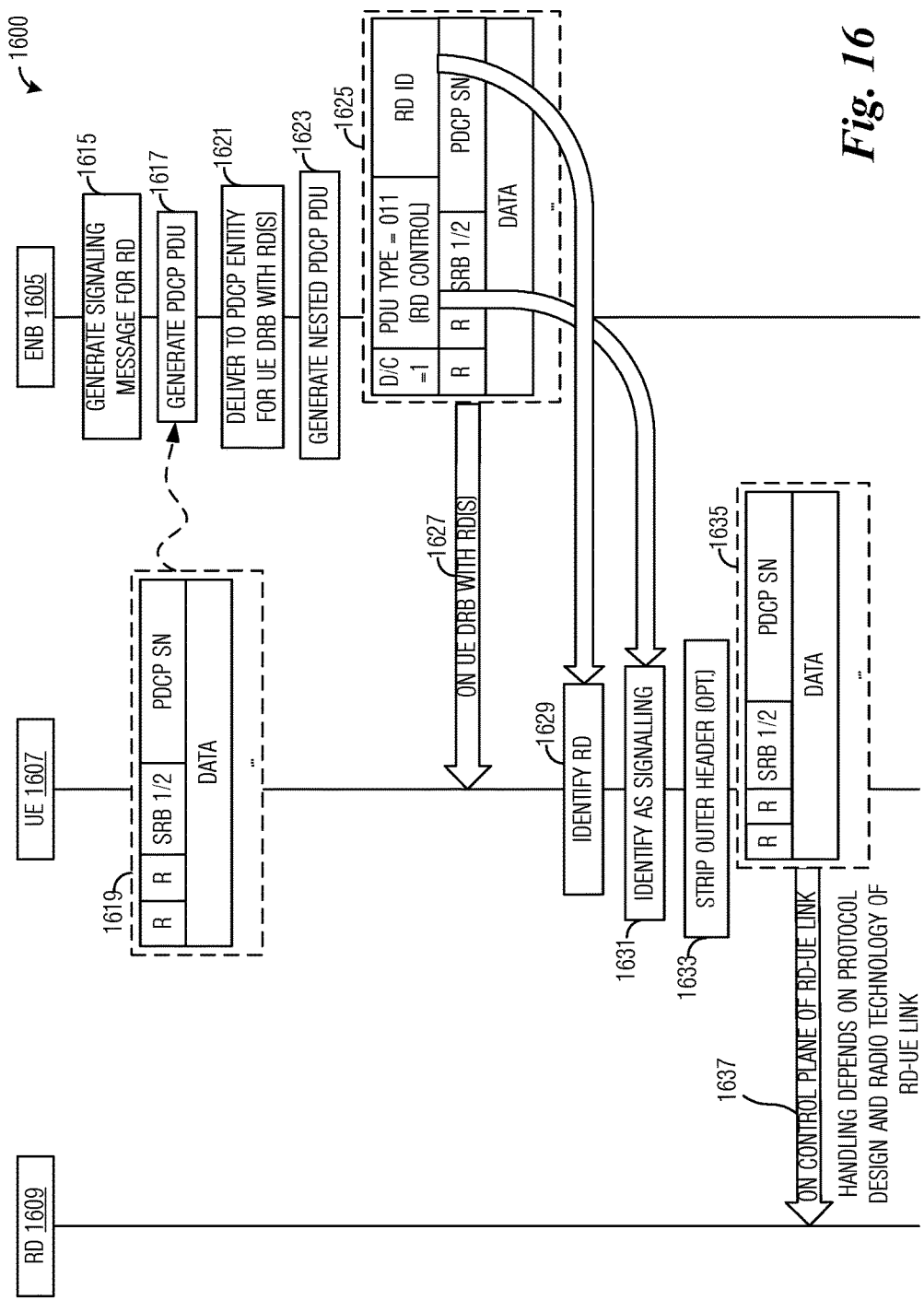
FIG. 16 illustrates a message flow diagram highlighting messages exchanged between devices and operations performed by the devices as the devices perform downlink signaling with RDs according to example embodiments described herein.

FIG. 16 illustrates a message flow diagram 1600 highlighting messages exchanged between devices and operations performed by the devices as the devices perform downlink signaling with RDs. Message flow diagram 1600 displays messages exchanged and operations performed by an eNB 1605, a relay UE 1607, and a RD 1609.

eNB 1605 generates control plane traffic (signaling) for RD 1609 (event 1615). The control plane traffic is delivered to a PDCP entity associated with RD 1609. eNB 1605 generates one or more PDCP PDUs from the control plane traffic (event 1617). The PDCP PDUs follow format 1619. eNB 1605 delivers the PDCP PDUs to a PDCP entity associated with relay UE 1607 (event 1621). eNB 1605 generates nested PDCP PDUs from the PDCP PDUs (event 1623). Each PDCP PDU results in a nested PDCP PDU. The nested PDCP PDUs follow format 1625. In a situation when there are multiple nested PDCP PDUs, the nested PDCP PDUs are aggregated so that they can be sent on a single DRB to relay UE 1607 (event 1627).

Relay UE 1607 identifies RDs associated with each nested PDCP PDU (event 1629). Relay UE 1607 identifies the PDU types of each PDCP PDU contained in the nested PDCP PDUs (event 1631). The PDU type of a PDCP PDU is indicated in a PDU type field in the header of the PDCP PDU, which is as a signaling PDU for forwarding in FIG. 16. Depending upon implementation, relay UE 1607 may strip the outer headers (the headers of the nested PDCP PDUs) of the nested PDCP PDUs (event 1633). In situations when relay UE 1607 strips the outer headers of the nested PDCP PDUs by removing the leading octet of each of the nested PDCP PDUs, the resulting PDCP PDUs follow format 1635. Relay UE 1607 sends the PDCP PDUs (or nested PDCP PDUs in the example embodiment wherein relay UE 1607 does not strip the outer headers) to respective RDs (event 1637). The PDCP PDUs (or the nested PDCP PDUs) are sent on short range links between relay UE 1607 and RD 1609.

According to an example embodiment, the control plane traffic associated with an RD is sent on a SRB(s) of a relay UE instead of a DRB. Sending the control plane traffic on SRB(s) eliminates the need to use two reserved values in the PDU type field. Furthermore, using SRB(s) may be more compatible with typical prioritization of signaling of control plane traffic versus data.

Figure 17:
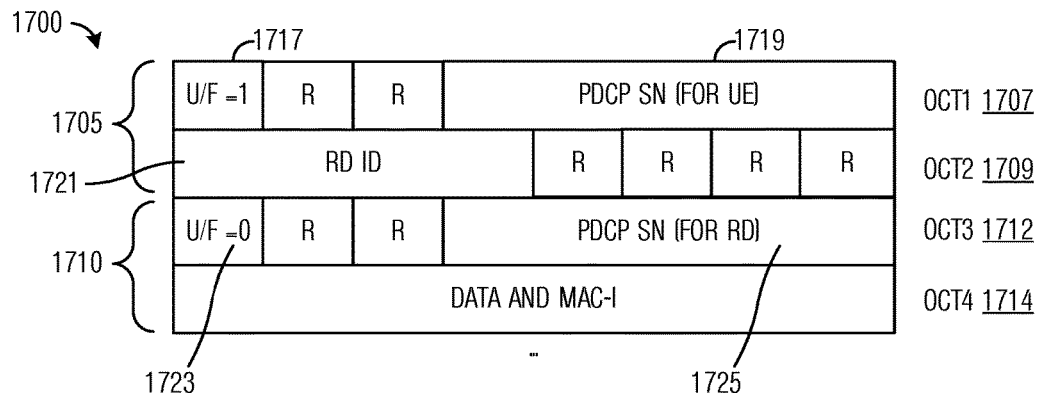
FIG. 17 illustrates an example nested PDCP PDU used for relaying control plane traffic on SRB(s) according to example embodiments described herein.

FIG. 17 illustrates an example nested PDCP PDU 1700 used for relaying control plane traffic on SRB(s). Nested PDCP PDU 1700 includes an outer header 1705 comprising two octets, first octet (OCT1) 1707 and second octet (OCT2) 1709, and a PDCP PDU 1710 comprising two or more octets, third octet (OCT3) 1712 and fourth octet (OCT4) 1714 and subsequent octets as needed. Outer header 1705 includes a UE (U)/Forwarding (F) (U/F) bit field 1717 used to indicate if nested PDCP PDU 1700 is used for UE signaling (e.g., U/F bit field 1717 set to "0") or control plane traffic forwarding (e.g., U/F field 1717 set to "1"). Outer header 1705 also includes a PDCP sequence number (SN) 1719 when nested PDCP PDU 1700 is being used for UE signaling, as well as a RD identifier field 1721 that includes an ID of a RD associated with nested PDCP PDU 1700. PDCP PDU 1710 also includes a U/F bit field 1723 to indicate if PDCP PDU 1710 is for UE (RD in this case) signaling or control plane traffic forwarding. In most situations, U/F bit field 1723 is set to indicate that PDCP PDU 1710 is for UE signaling. PDCP PDU 1710 also includes a PDCP SN 1725 for the RD.

According to an example embodiment, the control plane traffic may be sent on either SRB1 or SRB2, therefore, the distinction of which SRB was used to send the control plane traffic is preserved using a 2-valued indicator. Since traffic between eNB and relay UE can use either SRB1 or SRB2 as desired, no in-band indication needed. However, to preserve the SRB information for RDs or to allow the RDs to specify which SRB to use, an SRB indicator similar to that discussed previously is used.

Figure 18:
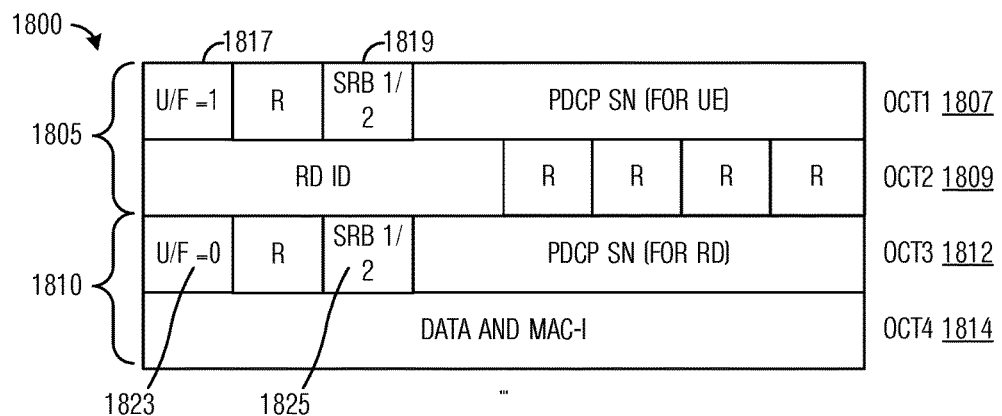
FIG. 18 illustrates an example nested PDCP PDU used for relaying control plane traffic on SRBs while preserving SRB information according to example embodiments described herein.

FIG. 18 illustrates an example nested PDCP PDU 1800 used for relaying control plane traffic on SRBs while preserving SRB information. Nested PDCP PDU 1800 includes an outer header 1805 comprising two octets, first octet (OCT1) 1807 and second octet (OCT2) 1809, and a PDCP PDU 1810 comprising two or more octets, third octet (OCT$_3$) 1812 and fourth octet (OCT4) 1814 and subsequent octets as needed. Outer header 1805 includes a U/F bit field 1817 to indicate if nested PDCP PDU 1800 is used for UE signaling or control plane traffic forwarding. Also include in outer header 1805 is SRB bit 1819 that indicates if SRB1 or SRB2 was used to convey the control plane traffic. As an illustrative example if SRB bit 1819 is set to "0" then SRB1 was used or if SRB bit 1819 is set to "1" then SRB2 was used. PDCP PDU 1810 also includes a U/F bit field 1823 to indicate if PDCP PDU 1810 is for UE (RD in this case) signaling or control plane traffic forwarding. In most situations, U/F bit field 1823 is set to indicate that PDCP PDU 1810 is for UE signaling. PDCP PDU 1810 also includes a SRB bit 1825 to preserve or specify SRB information.

When a device receives a nested PDCP PDU on a downlink SRB, if the U/F field of the outer header indicates that the nested PDCP PDU is used for control plane traffic forwarding, the SRB bit of the outer header and the SRB bit of the header of the PDCP PDU contained in the nested PDCP PDU will have the same value. The device may confirm this by checking the two SRB bits, set the SRB bit of the nested PDCP PDU, or assume that this is true. If the U/F field of the outer header indicates that the PDCP PDU is used for UE signaling and if the device is not connected to a relay UE, the device may ignore the SRB bit. But, if the U/F field of the outer header indicates that the PDCP PDU is used for UE signaling and if the device is connected to a relay UE, the SRB bit indicates if the device should consider the nested PDCP PDU is received on SRB1 or SRB2.

When a device sends a nested PDCP PDU on an uplink SRB, if the device is forwarding control plane traffic for a RD (in other words, the device is a relay UE), the device sets the SRB bit of the outer header equal to the SRB bit of the header of the PDCP PDU contained in the nested PDCP PDU. If the device is a RD connected to a relay UE, the device sets the SRB bit to indicate which SRB the PDCP PDU is to be sent. Otherwise, the SRB bit is considered to be a reserved bit and may be set to a specified value, e.g., "0".

Figure 19:
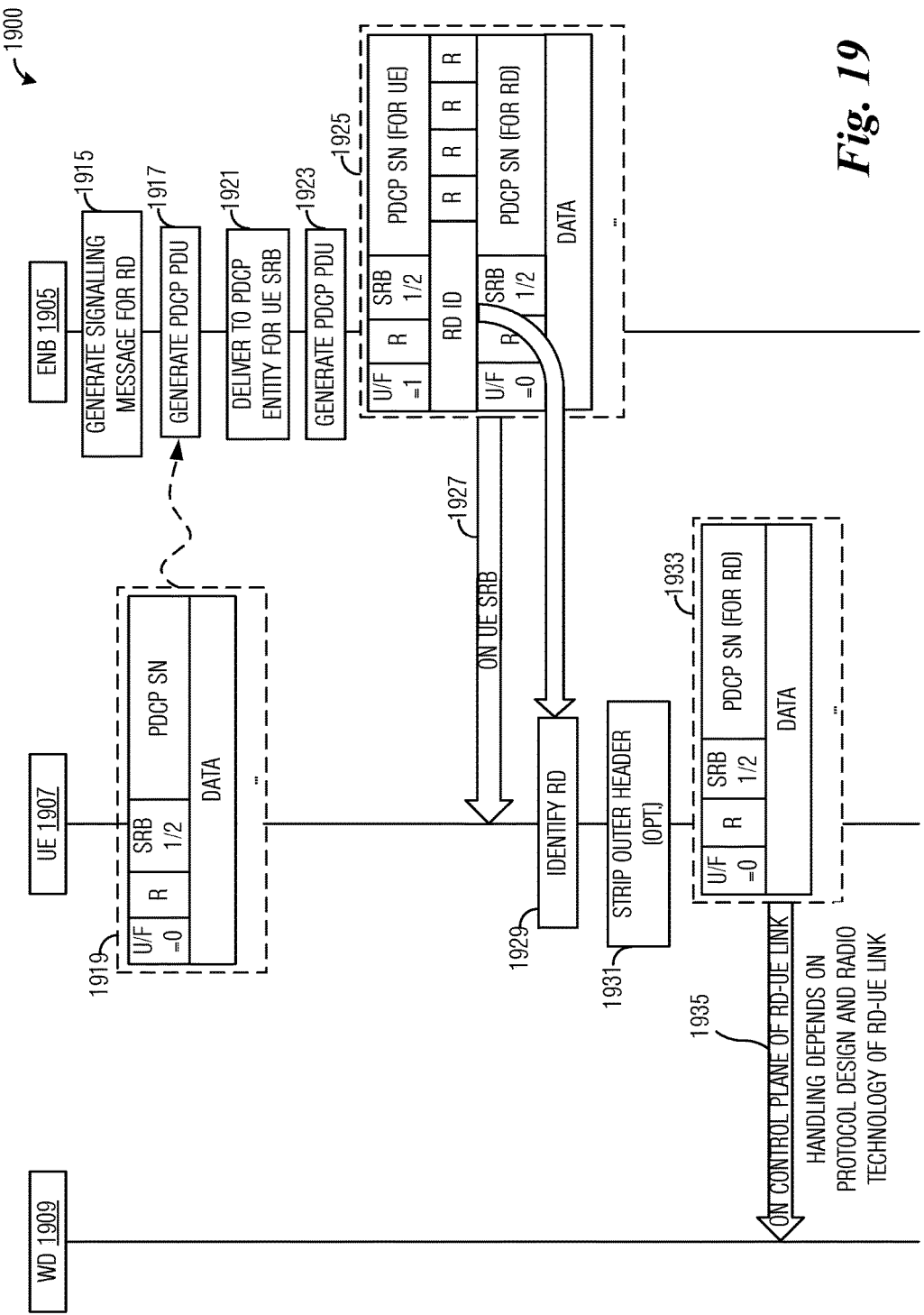
FIG. 19 illustrates a message flow diagram highlighting messages exchanged between devices and operations performed by the devices as the devices perform downlink signaling with RDs using SRBs according to example embodiments described herein.

FIG. 19 illustrates a message flow diagram 1900 highlighting messages exchanged between devices and operations performed by the devices as the devices perform downlink signaling with RDs using SRBs. Message flow diagram 1900 displays messages exchanged and operations performed by an eNB 1905, a relay UE 1907, and a RD 1909.

eNB 1905 generates control plane traffic (signaling) for RD 1909 (event 1915). The control plane traffic is delivered to a PDCP entity associated with RD 1909. eNB 1905 generates one or more PDCP PDUs from the control plane traffic (event 1917). The PDCP PDUs follow format 1919. eNB 1905 delivers the PDCP PDUs to a PDCP entity associated with relay UE 1907 (event 1921). eNB 1905 generates nested PDCP PDUs from the PDCP PDUs (event 1923). Each PDCP PDU results in a nested PDCP PDU. The nested PDCP PDUs follow format 1925. In a situation when there are multiple nested PDCP PDUs, the nested PDCP PDUs are aggregated so that they can be sent on a single DRB to relay UE 1907 (event 1927).

Relay UE 1907 identifies RDs associated with each nested PDCP PDU (event 1929). Depending upon implementation, relay UE 1907 may strip the outer headers (the headers of the nested PDCP PDUs) of the nested PDCP PDUs (event 1931). In situations when relay UE 1907 strips the outer headers of the nested PDCP PDUs by removing the leading octet of the nested PDCP PDUs, the resulting PDCP PDUs follow format 1933. Relay UE 1907 sends the PDCP PDUs (or nested PDCP PDUs in the example embodiment wherein relay UE 1907 does not strip the outer header) to respective RDs (event 1935). The PDCP PDUs (or the nested PDCP PDUs) are sent on short range links between relay UE 1907 and RD 1909.

Figure 20:
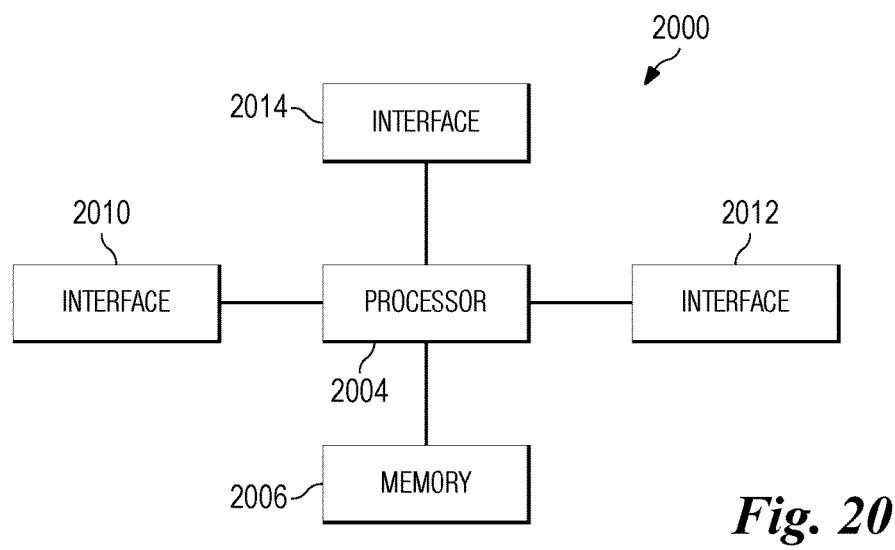
FIG. 20 illustrates a block diagram of an embodiment processing system for performing methods described herein.

FIG. 20 illustrates a block diagram of an embodiment processing system 2000 for performing methods described herein, which may be installed in a host device. As shown, the processing system 2000 includes a processor 2004, a memory 2006, and interfaces 2010-2014, which may (or may not) be arranged as shown in FIG. 20. The processor 2004 may be any component or collection of components adapted to perform computations and/or other processing related tasks, and the memory 2006 may be any component or collection of components adapted to store programming and/or instructions for execution by the processor 2004. In an embodiment, the memory 2006 includes a non-transitory computer readable medium. The interfaces 2010, 2012, 2014 may be any component or collection of components that allow the processing system 2000 to communicate with other devices/components and/or a user. For example, one or more of the interfaces 2010, 2012, 2014 may be adapted to communicate data, control, or management messages from the processor 2004 to applications installed on the host device and/or a remote device. As another example, one or more of the interfaces 2010, 2012, 2014 may be adapted to allow a user or user device (e.g., personal computer (PC), etc.) to interact/communicate with the processing system 2000. The processing system 2000 may include additional components not depicted in FIG. 20, such as long term storage (e.g., non-volatile memory, etc.).

In some embodiments, the processing system 2000 is included in a network device that is accessing, or part otherwise of, a telecommunications network. In one example, the processing system 2000 is in a network-side device in a wireless or wireline telecommunications network, such as a base station, a relay station, a scheduler, a controller, a gateway, a router, an applications server, or any other device in the telecommunications network. In other embodiments, the processing system 2000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 21:
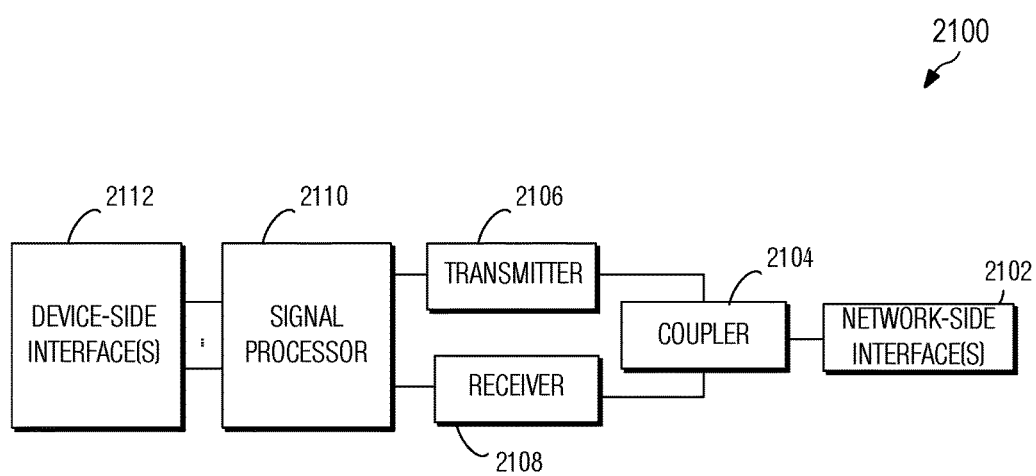
FIG. 21 illustrates a block diagram of a transceiver adapted to transmit and receive signaling over a telecommunications network according to example embodiments described herein.

In some embodiments, one or more of the interfaces 2010, 2012, 2014 connects the processing system 2000 to a transceiver adapted to transmit and receive signaling over the telecommunications network. FIG. 21 illustrates a block diagram of a transceiver 2100 adapted to transmit and receive signaling over a telecommunications network. The transceiver 2100 may be installed in a host device. As shown, the transceiver 2100 comprises a network-side interface 2102, a coupler 2104, a transmitter 2106, a receiver 2108, a signal processor 2110, and a device-side interface 2112. The network-side interface 2102 may include any component or collection of components adapted to transmit or receive signaling over a wireless or wireline telecommunications network. The coupler 2104 may include any component or collection of components adapted to facilitate bi-directional communication over the network-side interface 2102. The transmitter 2106 may include any component or collection of components (e.g., up-converter, power amplifier, etc.) adapted to convert a baseband signal into a modulated carrier signal suitable for transmission over the network-side interface 2102. The receiver 2108 may include any component or collection of components (e.g., down-converter, low noise amplifier, etc.) adapted to convert a carrier signal received over the network-side interface 2102 into a baseband signal. The signal processor 2110 may include any component or collection of components adapted to convert a baseband signal into a data signal suitable for communication over the device-side interface(s) 2112, or vice-versa. The device-side interface(s) 2112 may include any component or collection of components adapted to communicate data-signals between the signal processor 2110 and components within the host device (e.g., the processing system 2000, local area network (LAN) ports, etc.).

The transceiver 2100 may transmit and receive signaling over any type of communications medium. In some embodiments, the transceiver 2100 transmits and receives signaling over a wireless medium. For example, the transceiver 2100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2102 comprises one or more antenna/radiating elements. For example, the network-side interface 2102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, and/or an aggregating unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method comprising:
    receiving, by an evolved NodeB (eNB), a first data packet addressed to a first remote device (RD);
    constructing, by the eNB, a first packet data convergence protocol (PDCP) data protocol data unit (PDU) from contents of the first data packet;
    constructing, by the eNB, a PDCP control PDU by prepending an outer header to the first PDCP data PDU, the outer header comprising an identifier of the first RD;
    identifying, by the eNB, a relay device that serves the RD; and wirelessly transmitting, by the eNB, the PDCP control PDU to the relay device on a data radio bearer (DRB), the relay device being separately located from the eNB.

2. The method of claim 1, the outer header further comprising a PDU type indicator indicating that the PDCP control PDU includes the first PDCP data PDU for forwarding.

3. The method of claim 2, the outer header comprising:
a data/control (D/C) field; and
a PDU type field containing the PDU type indicator.

4. The method of claim 2, the PDU type indicator indicating data PDU forwarding or signaling PDU forwarding.

5. The method of claim 1, further comprising:
receiving, by the eNB, a second data packet addressed to the RD;
constructing, by the eNB, a second PDCP data PDU from contents of the second data packet;
aggregating, by the eNB, the first PDCP data PDU and the second PDCP data PDU; and
the constructing the PDCP control PDU comprising constructing the PDCP control PDU by prepending the outer header to the aggregated first and second PDCP data PDUs.

6. A method comprising:
wirelessly receiving, by a relay device on a data radio bearer (DRB), a packet data convergence protocol (PDCP) control protocol data unit (PDU) from an evolved Node B (eNB), the PDCP control PDU comprising an outer header and a first PDCP data PDU, the outer header comprising an identifier of a remote device (RD), and the relay device being separately located from the eNB;
extracting, by the relay device, the first PDCP data PDU from the PDCP control PDU; and
wirelessly transmitting, by the relay device, the first PDCP data PDU to the RD.

7. The method of claim 6, the outer header further comprising a PDU type indicator indicating that the PDCP control PDU includes the first PDCP data PDU for forwarding.

8. The method of claim 7, the outer header comprising:
a data/control (D/C) field; and
a PDU type field containing the PDU type indicator.

9. The method of claim 7, the PDU type indicator indicating data PDU forwarding or signaling PDU forwarding.

10. The method of claim 6, the PDCP control PDU further comprising a second PDCP data PDU aggregated with the first PDCP data PDU, the method further comprising:
extracting, by the relay device, the second PDCP data PDU from the PDCP control PDU; and
transmitting, by the relay device, the second PDCP data PDU to the RD.

11. An evolved NodeB (eNB) comprising:
a non-transitory memory storage comprising instructions; and
one or more processors in communication with the memory storage, wherein the one or more processors execute the instructions to:
receive a first data packet addressed to a first remote device (RD);
construct a first packet data convergence protocol (PDCP) data protocol data unit (PDU) from contents of the first data packet;
construct a PDCP control PDU by prepending an outer header to the first PDCP data PDU, the outer header comprising an identifier of the first RD;
identify a relay device that serves the RD; and
wirelessly transmit the PDCP control PDU to the relay device on a data radio bearer (DRB), the relay device being separately located from the eNB.

12. The eNB of claim 11, wherein the outer header further comprises a PDU type indicator indicating that the PDCP control PDU includes the first PDCP data PDU for forwarding.

13. The eNB of claim 12, wherein the outer header comprises:
a data/control (D/C) field; and
a PDU type field containing the PDU type indicator.

14. The eNB of claim 12, wherein the PDU type indicator indicates data PDU forwarding or signaling PDU forwarding.

15. The eNB of claim 11, wherein the one or more processors execute the instructions to:
receive a second data packet addressed to the RD;
construct a second PDCP data PDU from contents of the second data packet; and
aggregate the first PDCP data PDU and the second PDCP data PDU; and
wherein the one or more processors execute the instructions to construct the PDCP control PDU comprises the one or more processors execute the instructions to construct the PDCP control PDU by prepending the outer header to the aggregated first and second PDCP data PDUs.

16. A relay device comprising:
a non-transitory memory storage comprising instructions; and
one or more processors in communication with the memory storage, wherein the one or more processors execute the instructions to:
wirelessly receive, on a data radio bearer (DRB), a packet data convergence protocol (PDCP) control protocol data unit (PDU) from an evolved Node B (eNB), the PDCP control PDU comprising an outer header and a first PDCP data PDU, the outer header comprising an identifier of a remote device (RD), and the relay device being separately located from the eNB;
extract the first PDCP data PDU from the PDCP control PDU; and
wirelessly transmit the first PDCP data PDU to the RD.

17. The relay device of claim 16, wherein the outer header further comprises a PDU type indicator indicating that the PDCP control PDU includes the first PDCP data PDU for forwarding.

18. The relay device of claim 17, wherein the outer header comprises:
a data/control (D/C) field; and
a PDU type field containing the PDU type indicator.

19. The relay device of claim 17, wherein the PDU type indicator indicates data PDU forwarding or signaling PDU forwarding.

20. The relay device of claim 16, wherein the PDCP control PDU further comprises a second PDCP data PDU aggregated with the first PDCP data PDU, and wherein the one or more processors execute the instructions to:
extract the second PDCP data PDU from the PDCP control PDU; and
transmit the second PDCP data PDU to the RD.

* * * * *